United States Patent [19]
Scott et al.

[11] 3,919,298
[45] Nov. 11, 1975

[54] 1,7-BIS(SULFONIC ACID)-M-CARBORANES

[75] Inventors: Robert N. Scott, Wallingford; Haywood Hooks, Jr., West Haven, both of Conn.

[73] Assignee: Olin Corporation, New Haven, Conn.

[22] Filed: Sept. 26, 1972

[21] Appl. No.: 292,359

[52] U.S. Cl.......... 260/503; 260/543 R; 260/543 H; 260/695; 252/62.3
[51] Int. Cl............................................ C07c 143/00
[58] Field of Search...................... 260/503, 543 H

[56] References Cited
UNITED STATES PATENTS
2,316,847  4/1943  Dreyfus........................ 260/513 H OTHER PUBLICATIONS
Scott et al, Inorganic Chemistry, 10, 2358 (1971)

*Primary Examiner*—Bernard Helfin
*Assistant Examiner*—Nicky Chan
*Attorney, Agent, or Firm*—Kenneth P. Glynn; Eugene Zagarella, Jr.

[57] ABSTRACT

1,7-Bis(sulfonic acid)-m-carboranes are prepared by a two-step Lewis acid catalyzed hydrolysis. These compounds are useful as a catalyst for polymerization and isomerization reactions and their water solubility plus neutron capture capability make them useful in a variety of ways in nuclear facilities and operations.

5 Claims, No Drawings

1,7-BIS(SULFONIC ACID)-M-CARBORANES

The invention herein described was made in the course of or under a contract or subcontract thereunder, with the Department of the Navy.

This invention relates to novel bis(sulfonic acid)-m-carboranes and the method of preparation.

The novel sulfonic acid-m-carboranes of this invention have the formula $$HO_3SCB_{10}H_9RCSO_3H \qquad (I)$$

wherein R is selected from the group consisting of hydrogen, COOH, and

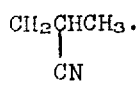

The compounds of this invention (I) have the desirable characteristic of being water soluble and have a wide variety of uses. For example, they may be used as catalysts in polymerization and isomerization reactions. Additionally these compounds may be used in boron-neutron capture therapy, in neutron radiation shields and as moderators in nuclear facilities.

Attempts to prepare the compounds of this invention by hydrolysis of the bis(chlorosulfonyl)-m-carborane were unsuccessful. However, in accordance with the method of this invention the compounds (I) were prepared by a novel two-step Lewis acid catalyzed hydrolysis involving the in-situ preparation of the bis(Lewis acid) adduct and subsequent hydrolysis with dilute acid. Thus, this method may be illustrated by the following equation wherein 1,7-bis(chlorosulfonyl)-m-carborane was reacted with aluminum chloride as the Lewis acid in a benzene medium followed by hydrolysis with HCl:

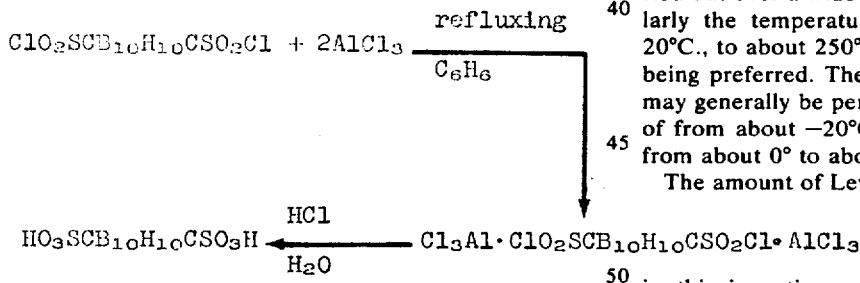

The bis(chlorosulfonyl)-m-carboranes useful as starting materials may be obtained by oxidizing the bis(chlorosulfenyl)-m-carborane or the desired derivative in the presence of sodium hypochlorite in the manner disclosed in U.S. Pat. No. 3,634,505 (Schroeder et al, issued Jan. 11, 1972). The bis(chlorosulfenyl) carboranes may be obtained by reacting chlorine with a bis-mercapto carborane or the respective derivative as was disclosed in the previously noted U.S. Pat. No. 3,634,505. The bis-mercapto carborane compounds noted above may be obtained by reacting a di(alkali metal)carborane or the respective derivative with sulfur in a substantially anhydrous polar solvent medium in accordance with the disclosure of U.S. Pat. No. 3,674,853 (Obenland et al, issued July 4, 1972). The di(alkali metal)carboranes may be obtained by reacting an alkali metal alkyl compound with m-carborane or the respective derivative as disclosed in U.S. Pat. No. 3,148,219 (Ager et al, issued Sept. 8, 1964). Finally the carborane materials themselves may be obtained in the manner disclosed in U.S. Pat. No. 3,509,216 (Obenland et al, issued Apr. 28, 1970).

A wide variety of Lewis acid compounds (i.e., aprotic acids) may be employed in the method of this invention provided they are capable of forming an adduct with the (chlorosulfonyl) carborane material and will not be chemically reactive with any of the other components of the reaction system. More particularly the Lewis acid used in this invention will be a halide (e.g. chloride, bromide, iodide or fluoride) of aluminum, tin, boron, or iron.

Specific examples of the useful Lewis acids include aluminum chloride, aluminum bromide, stannous chloride, stannous bromide, stannic chloride, boron trichloride, boron trifluoride, and ferric chloride. Aluminum chloride is a preferred Lewis acid. Other examples of the useful Lewis acids may be found in George A. Olah's book entitled, "Friedel-Crafts and Related Reactions" Volume 1, 1963, Interscience Publishers.

The reaction is conveniently carried out in the presence of an inert organic solvent. A wide variety of such solvents may be used, provided they are not reactive with anything in the reaction system. Useful inert organic solvents include aliphatic and aromatic hydrocarbons and mixtures thereof. Illustrative of such compounds are the following: benzene, toluene, xylene, hexane, heptane and cyclohexane. Further illustrations of solvents of the type which may be used in this invention are disclosed in "Industrial Solvents" by Ibert Mellan, 2nd Edition, 1950.

The acid material used in the hydrolysis step of this invention may be any mineral acid and more particularly HCl or $H_2SO_4$.

The first step of the method of this invention wherein the Lewis acid adduct is formed may generally be carried out over a wide temperature range. More particularly the temperature may vary from ambient, i.e., 20°C., to about 250°C. with the refluxing temperature being preferred. The second step involving hydrolysis may generally be performed over a temperature range of from about −20°C. to about 40°C. and preferably from about 0° to about 20°C.

The amount of Lewis acid component which is used in this invention will generally be a stoichiometric amount or slight excess thereof.

The following example is presented to further illustrate the invention without any intention of being limited thereby.

EXAMPLE

A 250 ml, 3-neck flask equipped with mechanical stirrer, reflux condenser and nitrogen inlet was charged with 13.3 g (0.039 mol) of 1,7-bis(chlorosulfonyl)-m-carborane, 125 ml of dry benzene and 10.7 g (0.080 mol) of aluminum chloride. The reaction mixture was heated to reflux for 3 hrs. then cooled to 0°C. and hydrolyzed with dilute hydrochloric acid. The resulting precipitate was recrystallized from dilute hydrochloric acid to yield 13 g. of the bis sulfonic acid.

Anal. Calcd. for $B_{10}C_2H_{12}S_2O_6$: C, 7.86; H, 4.23; B, 35.5; S, 21.0

Molecular weight 304
Found: C, 8.28; H, 4.25; B, 36.36; S, 20.97;
Molecular weight (osmometry) 306.

What is claimed is:

1. A 1,7-bis(sulfonic acid)-m-carborane of the formula:

$$HO_3SCB_{10}H_{10}CSO_3H.$$

2. A method for the preparation of 1,7-bis(sulfonic acid)-m-carborane of the formula:

$$HO_3SCB_{10}H_{10}CSO_3H$$

which comprises reacting 1,7-bis(chlorosulfonyl)-m-carborane of the formula:

$$ClO_2SCB_{10}H_{10}CSO_2Cl$$

with a Lewis acid selected from the group consisting of a halide of aluminum, tin, boron, or iron in an inert organic solvent at a temperature of from about 0°C. to about 250°C. followed by hydrolysis with a mineral acid.

3. The method of claim 2 wherein said mineral acid is selected from the group consisting of HCl and $H_2SO_4$.

4. The method of claim 3 wherein said Lewis acid is aluminum chloride.

5. The method of claim 4 wherein said temperature is the refluxing temperature and said hydrolyses is performed at a temperature of from about −20°C. to about 40°C.

* * * * *